United States Patent Office 3,502,614
Patented Mar. 24, 1970

3,502,614
STABILISATION OF POLYOLEFINES
Derek Harold Wood, Harrogate, England, assignor to Imperial Chemical Industries Limited, London, England, a corporation of Great Britain
No Drawing. Filed Nov. 2, 1966, Ser. No. 591,401
Claims priority, application Great Britain, Nov. 11, 1965, 47,900/65
Int. Cl. C08f 45/60, 45/58
U.S. Cl. 260—45.9         3 Claims

ABSTRACT OF THE DISCLOSURE

A polyolefine composition of improved resistance to degradation is disclosed, wherein the polyolefine composition is stabilised by at least one compound of the formula:

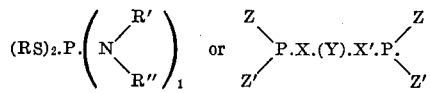

This invention relates to the stabilisation of polyolefines and, in particular, to polyolefine compositions including at least one organic compound having present therein phosphorus-sulphur and phosphorus-nitrogen bonds, which exhibit improved resistance to degradation.

It is well known that polyolefines are susceptible to photo-oxidation. In particular those produced from olefines having three or more carbon atoms possess tertiary carbon atoms in the polymer chain which may form active centres for the initiation of photodegradation. Polyolefines are also subject to degradation by heat and for effective protection of the polymers and articles shaped from them it is often necessary to add substances which stabilise the polyolefine against the effect of light, oxygen and heat. Many substances and mixtures of substances have been proposed hitherto, but there remains to be found a wholly acceptable additive or combination of additives which is durable and possesses a high stabilising effect.

I have now found that certain organic compounds having present therein phosphorus-sulphur and phosphorus-nitrogen bonds exhibit a stabilising effect when incorporated into polyolefines, particularly when used in addition to known U.V. stabilisers and/or phenolic antioxidants.

According to the present invention we provide a polyolefine resistant to degradation, characterised in that at least one organic compound having at least one phosphorus-sulfur bond and at least one phosphorus-nitrogen bond present therein represented by the following general formula;

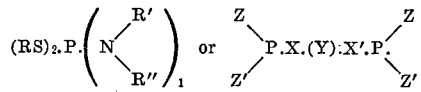

wherein R and R' are the same or different and are an alkyl or an aryl group, R'' is hydrogen, an alkyl or an aryl group. Y is an alkylene, arylene or alkarylene group having at least two carbon atoms therein, X and X' are the same or different and are —NH— or —S— and Z and Z' are the same or different and are

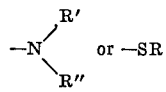

is incorporated in the polyolefine.

Although the polyolefine is stabilised to some extent by incorporation of the foregoing organic compounds I have found that these compounds act synergistically when incorporated in the polyolefine together with known U.V. stabilisers and/or phenolic antioxidants, giving rise to improved protection against a wider range of degradative influences.

By U.V. stabiliser is meant any compound capable of affording protection against the action of light by absorbing ultraviolet light energy and dissipating it without effect on the surrounding medium. Several types of chemical compounds are effective in this way, as for example, derivatives of hydroxybenzophenone or of benzotriazole, salicylates and other aromatic esters or unsaturated cyano compounds. In the term U.V. stabiliser is also included metal-organic compounds such as nickel organic complexes, described for example in British patent specification 958,830 and 986,368. These compounds have a weaker U.V. absorption than the foregoing compounds and probably impart light stabilisation by a different mechanism. We have found that a marked improvement in the light resistance of polyolefines containing such U.V. stabilisers is brought about by the addition of the foregoing organic compounds containing nitrogen, sulphur and phosphorus.

Phenolic antioxidants suitable for use in combination with the organic compounds of this invention are any of those known to be active in polyolefines, in particular phenolic compounds wherein the phenolic hydroxyl group or groups is or are sterically hindered by one or more adjacent bulky substituents, as for example, 4,4'-thiobis (2,6-di-tert-butyl-phenol), 4,4'-thiobis(3-methyl - 6 - tert-butylphenol) or 1,1,3-tris(2-methyl - 4-hydroxy - 5-tert-butylphenyl)-butane.

Organic compounds containing phosphorus-sulphur and phosphorus-nitrogen bonds according to the invention may be prepared, for example, by reaction of a sulphur-containing organo-phosphorus compound, as for example a trialkyltrithiophosphite with a chlorinating agent, as for example, phosphorus trichloride and then reaction of the chlorinated product with a mono- or di-amine, the amine groups of which may be primary or secondary groups. In the latter case, that is when a secondary diamine is used to react with the chlorinated organophosphorus compound, X or X' in the foregoing general formula may be —NR—.

Compounds prepared in this fashion are frequently waxy solids which are not easily purified and thus the reaction products may not be single chemical substances. Such mixtures, however, are very effective stabilisers or components of a stabilising combination.

Incorporated in the polyolefine of one or more additives according to the invention is accomplished by any of the known methods, as for example, mixing of the powdered polyolefine with a solution of the additives in a volatile solvent followed by drying and granulation of the mixture or by milling the additives directly into the softened polypropylene in a heated Banbury type mixing machine. The polyolefine mixture is then used for production of shaped articles which may be fibres, filaments or films formed by melt spinning or extrusion of moulded articles formed by injection moulding.

The amount of each additive used, that is, the organic compound containing phosphorus-sulphur and phosphorus-nitrogen bonds, the U.V. stabiliser and the phenolic antioxidant varies to some extent with the use to which the polyolefine article is to be put but in general a concentration of 0.05–5% by weight based on the polyolefine is adequate. In addition non-stabilising additives, as for example metal soaps or dyeability-enhancing substances may also be included.

I have found the present invention to be particularly useful, for improving the stability of shaped articles of

EXAMPLE 1

Preparation of 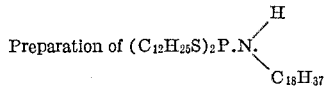

Trilauryltrithiophosphite, 38.1 parts, and phosphorus trichloride, 4.2 parts, are heated together at 50° C. during 24 hours. Part of the chlorinated product, 9.4 parts, is reacted at reflux temperature with n-octadecylamine, 10.8 parts, in solution in benzene, 44 parts, during 24 hours after which the mixture is cooled, filtered and the solvent distilled off to leave a waxy solid product which is mainly the compound,

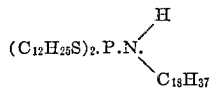

EXAMPLE 2

Preparation of $(C_{12}H_{25}S_2).P.NH(CH_2)_6.NH.P.(S.C_{12}H_{25})_2$

The chlorinated intermediate product of Example 1, 9.4 parts, is reacted at reflux temperature with hexamethylene diamine, 1.2 parts and sodium carbonate, 1 part in benzene, 44 parts during 24 hours, after which the mixture is cooled, filtered and the solvent distilled off to leave a waxy solid product which is mainly

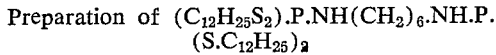

EXAMPLES 3–4

An intimate mixture of powdered polypropylene, (100 parts) the U.V.-stabiliser, 2-hydroxy-4-octyloxybenzophenone, 0.5 part, the antioxidant 1,1,3-tris(2-methyl-4-hydroxy-5-tert-butylphenyl)butane, 0.1 part, and 0.5 part of (a) the compound produced in Example 1 (Example 3) or (b) the compound produced in Example 2 (Example 4), is prepared by blending the powdered polyolefine with a solution of the additives in benzene and then drying the mixture. The compounded mixtures are melt spun into filaments at 190° C., the spun filaments are drawn to a draw ratio of 8:1 and plied with twisting to produce yarns having 144, 5 denier filaments and a twist of 5 turns per inch. Specimens of these yarns are exposed for 623 and 946 hours in a "Weather-O-Meter" (Xenon arc) and the retention of breaking strength as a percentage of the initial unexposed value is determined with the following results:

| Example | Retention of strength, percent | |
|---|---|---|
| | After 623 hr. | After 946 hr. |
| 3 | 83 | 63 |
| 4 | 84 | 69 |

COMPARATIVE EXAMPLE

Polypropylene yarn containing 0.5% by weight of dilauryl thiodipropionate in place the products of Examples 1 and 2 is prepared as in Examples 3–4 and when exposed in the same way gives only 71 and 48% retention of strength after 623 and 946 hours exposure respectively.

What I claim is:

1. A polypropylene composition resistant to degradation, said composition consisting essentially of polypropylene and from about 0.05 to 5% by weight of each of
(a) an organophosphorus compound represented by the formula:

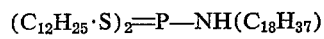

or

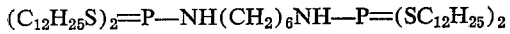

(b) 2-hydroxy-4 octyloxybenxophenone and
(c) 1,1,3-tris (2-methyl-4-hydroxy-5-tert-butylphenyl)-butane.

2. A composition according to claim 1 wherein the compound (a) is

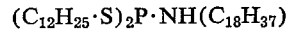

3. A composition according to claim 1 wherein the compound (a) is

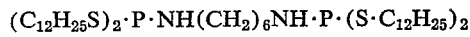

References Cited

UNITED STATES PATENTS

| | | | |
|---|---|---|---|
| 3,100,197 | 8/1963 | Heuck et al. | 260—45.9 |
| 3,224,889 | 12/1960 | Schulde et al. | 260—45.9 |
| 3,256,312 | 6/1966 | Strobel et al. | 260—45.9 |
| 3,359,233 | 12/1967 | Mirviss et al. | 260—45.9 |
| 3,278,483 | 11/1966 | Wright et al. | 260—45.7 |
| 3,255,151 | 6/1966 | Hecker et al. | 260—45.95 |

HOSEA E. TAYLOR, JR., Primary Examiner

U.S. Cl. X.R.

260—23, 45.8, 45.85, 45.95, 959; 264—177